May 31, 1955   J. R. BASHOR ET AL   2,709,267
PRECISION TAPPING SPINDLE
Filed May 21, 1951
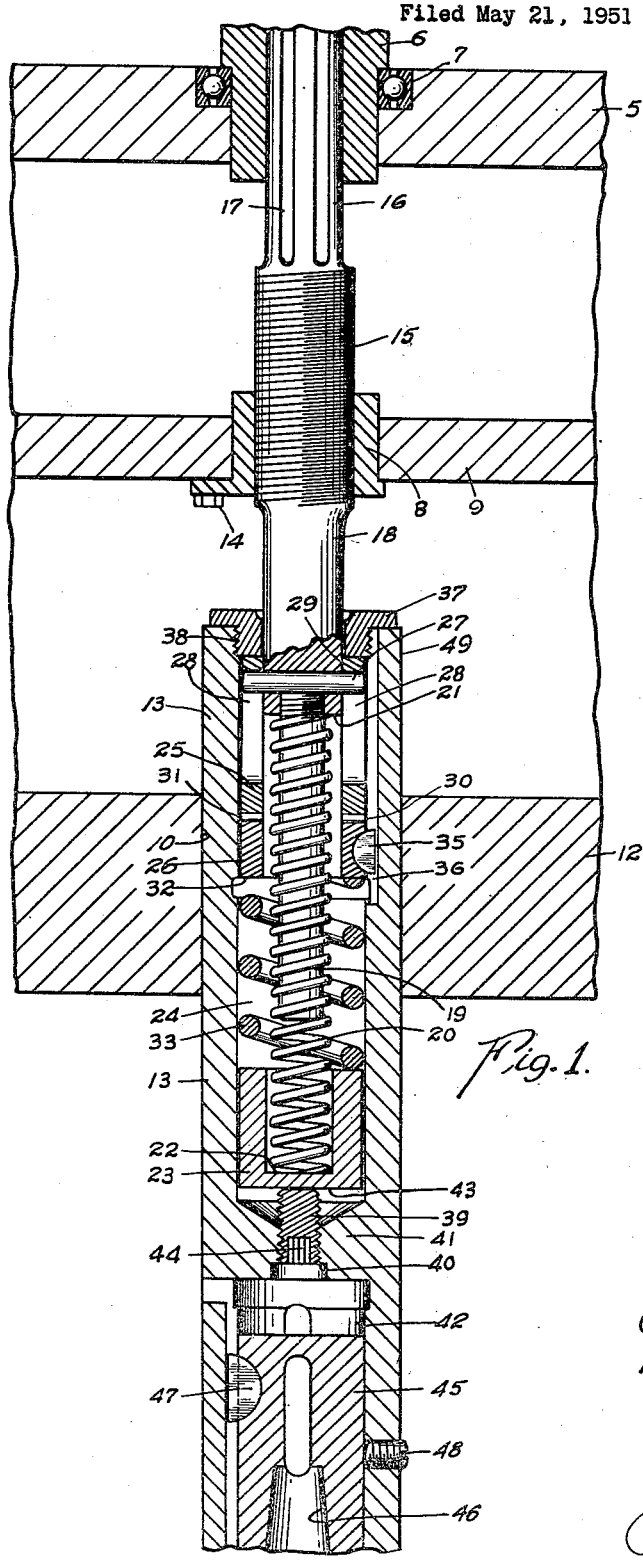
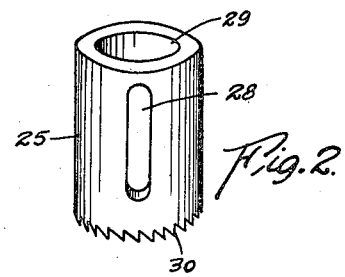
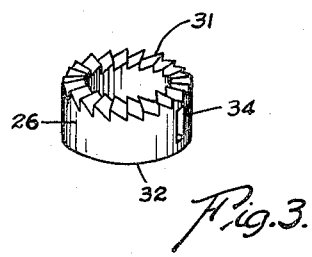
James R. Bashor
Alfred P. Speckin
INVENTORS
BY Joseph F. Zugelter
Atty.

United States Patent Office 2,709,267
Patented May 31, 1955

2,709,267

PRECISION TAPPING SPINDLE

James R. Bashor and Alfred P. Speckin, Cincinnati, Ohio, assignors to United States Drill Head Co., Cincinnati, Ohio, a corporation of Ohio Application May 21, 1951, Serial No. 227,458

11 Claims. (Cl. 10—135)

The present invention relates to improvements in a tapping spindle, such as may be used in machines employed for threading a multiplicity of holes simultaneously in a drilled work-piece. It will be evident also, from the following description, that the device may be employed in forming external threads upon a rod or shaft, by substituting a thread-cutting die for the threading tap, and that the device is applicable to single spindle machines as well as to those of the multiple spindle variety.

An object of the invention is to provide an improved inexpensive tapping spindle which is advanced and retracted on a definite lead while rotating, to ensure extreme accuracy in the performance of a threading operation.

Another object is to provide a tapping spindle of the character mentioned, with means to prevent tool breakage in the presence of undue resistance to rotation, or to linear travel of the tool. Such resistance may result from various causes, the common ones being due to the tool bottoming in the drilled hole of the work-piece, or meeting a hard spot therein, or by reason of advancing the tool against the work-piece where no hole, or a hole of insufficient size, has been drilled prior to the tapping operation.

A further object of the invention is to provide a tapping mechanism having the features above mentioned, and which automatically re-sets itself for a subsequent tapping operation after the tool has bottomed in a shallow hole, or has failed to complete its full advancement into the hole for any reason.

Another object is to avoid waste of time and labor in the re-setting of tapping tools on a multiple spindle tapping machine, resulting from incomplete tapping of any holes in the work-piece.

Another object is to provide a tapping mechanism, useful either singly or in the multiple arrangement, for regularly bottom-tapping all holes in the work-piece to obtain maximum thread depth therein.

A further object is to so construct a device of the character stated, as to embody extreme simplicity of manufacture, and of adjustment incident to usage, provision being made also for facilitating any needed repairs and maintenance, including proper and adequate lubrication.

Another important object is to eliminate, by improvements in design and construction, any tendency of the tool or its holder to wobble laterally when under strain, due to extension of telescopic parts having run-out clearance between them.

The foregoing and other objects are attained by the means described herein, and illustrated upon the accompanying drawing, in which:

Fig. 1 is a vertical cross-sectional view of the improved tapping spindle structure applied to the driving head of a tapping machine.

Fig. 2 is a perspective view of a driving clutch element of the apparatus.

Fig. 3 is a perspective view of a driven clutch element which cooperates with the clutch element of Fig. 2.

With the increasing use of multiple spindle drilling and tapping machinery, a demand has arisen for better and more efficient means of tapping or threading on a rapid production basis. Maximum efficiency requires that tapping spindles shall be quickly and easily replaceable; that they shall be always effectively lubricated and shall withstand wear resulting from rapid and continuous production; that such spindles upon being retracted from the work, shall be ready for a succeeding operation without expenditure of valuable time and expensive labor in manual re-setting or readjusting; that all threads upon the work shall be accurately formed to avoid assembly difficulties; and that failure of one tool to perform its intended function, shall not interfere with full and complete performance of other tools working in the same operation. These and other requirements, including low manufacturing and selling cost, and minimum maintenance costs, are met by the improved tapping spindle structure of the present invention.

The drawing shows at 5, the bottom plate or wall of a gear box which in common practice will support a series of splined drive members or shafts 6 rotated usually in a common direction, and in unison, by the driving motor of a drilling machine or the like. The drive members 6, only one of which is shown, will generally be journaled in bearings 7 of the gear box, located in accordance with the pattern of holes provided in a work-piece to be tapped. In true alignment with the drive member 6, there is provided a lead screw nut 8 supported in a bracket 9 of the machine head, and also in alignment therewith is a bore 10 in an outboard spindle bearing member 12 constituting part of the head. The wall of bore 10 furnishes a bearing for the spindle 13, which is a cylinder.

The lead screw nuts 8, corresponding in number to the number of driving members 6, are detachably mounted upon the bracket 9, as by means of screws 14, to provide for quick and easy bodily displacement of the entire spindle assembly in a downward direction. By means of this arrangement, a different tapping spindle assembly may be quickly substituted for any other, with a minimum expenditure of time and effort.

It is to be understood that any suitable form of means may be provided for detachably securing the nut to the bracket, the means shown being exemplary only.

The spindle 13 carries at its upper portion a spindle shaft 18 on which is formed a lead screw 15 and a tang or extension 16, the latter being splined or keyed as shown at 17, or otherwise formed to effect a telescopic driving connection with the drive shaft or member 6. The connection is such that the drive is maintained at all elevations of the spindle. The drive member 6 has rotational movement only, and cannot shift axially with the spindle and the lead screw. The screw and the extension 16 may be made integral with the shaft 18, and screw 15 is always in threaded engagement with the stationary nut 8.

Depending axially from the spindle shaft 18 is a pilot pin 19 for a helical inner compression spring 20 which surrounds the pin. Opposite ends of this spring abut the lower end 21 of the spindle shaft, and the seat 22 of an adjusting spacer 23 located at the bottom of the upper spindle bore 24. The purpose of the inner spring 20 is to maintain a yieldingly projected condition of spindle 13 relative to the shaft 18, with a force proper for starting a tap into a hole to be threaded. Spring 20 accordingly may be referred to as a spindle projector, and the force thereof may be substantially constant, though subject to slight variation incidental to vertical adjustment of spacer 23 for another purpose. Thus it may be noted that the projectile force of spring 20 is not critical.

The driving connection between the spindle shaft 18 and the spindle 13 comprises an overrunning clutch, the parts of which are indicated at 25 and 26. Clutch element 25 is adapted to be positively rotated by spindle shaft 18, through the agency of an extensible or sliding connection, herein shown by way of example as a pin and slot connection. The pin 27 carried by the lower end of shaft 18, may have its opposite ends loosely received in the longitudinal diametrally opposed slots 28 of the driving clutch member 25 as shown, so that any upward bodily shifting movement of the spindle 13 will not interfere with the driving relationship at the pin and slot connection. The clutch member is bored longitudinally as at 29 to slidingly embrace the lower end of the spindle shaft in the region of the drive pin. As will be understood, the clutch member 25 is rotational within the spindle bore 24.

Clutch members 25 and 26 have their adjacent annular ends provided with teeth 30 and 31 adapted to cooperate in translating rotary motion, in a manner to be described. The driven clutch element 26 is cylindrical in form, and has a lower annular edge 32 forming an abutment for one end of a rather powerful compression spring 33, the opposite end of which seats upon the adjusting spacer 23. The purpose of the clutch spring 33 is to induce engagement of the clutch teeth 30 and 31 with a yielding force which at times may be overcome to permit overrunning of the clutch parts in one direction of rotation. Clutch element 26 is so related to the spindle 13, as to be capable of longitudinal sliding movement therein, but precluded from relative rotation. This relationship may be achieved in various ways, for example, by furnishing the clutch member with a key seat 34 to embrace a key 35, which latter may travel vertically to a limited extent within the interior keyway 36 of the spindle 13.

From the foregoing, it readily will be appreciated that spring 33 constantly applies an upward force to the driven clutch member 26, tending always to keep the clutch teeth engaged, while the driving clutch member 25 is backed up by the assembly retaining element 37 at the upper end of the spindle bore 24. The retaining element 37 may take any suitable form, herein shown by way of example, as a removable nut having a threaded connection at 38 with the upper end of the spindle. Spindle shaft 18 is slidable through the nut, and rotatable therein at times.

The force which the clutch spring 33 imposes upon the driven clutch member 26 may be predetermined and varied by means of a clutch spring adjuster. The adjuster is capable of considerable modification in construction, but may be simply a screw 39 threadedly supported in a reduced internally threaded axial bore 40 in the transverse wall or partition 41 which separates the upper spindle bore 24 from the lower spindle bore 42. The upper end of the adjusting screw bears against the bottom wall 43 of the spacer 23, which upon rotation of the screw, may be held by the screw at various elevated positions within the spindle bore 24, in opposition to the force of the spring 33. The screw may have a socket head 44 or the equivalent, accessible through the lower spindle bore 42 for adjustment purposes, the understanding being that a suitable tool may be applied to the screw head upon removal of the tap holder or adapter 45. Part 45 is a conventional attachment for the spindle, and may comprise a cylindrical body adapted to receive a tap or other tool within its central tapered bore 46. By means of a key 47 and set screw 48, the holder or adapter may be secured for rotation with the spindle.

The operation of the device is as follows. Assuming that a tap is applied to the holder 45, and that a work-piece is located beneath the tap, having a proper size of hole to be threaded, the operator starts the machine. As the spindle shaft 18 rotates, its lead screw advances the tap into the hole of the work-piece, the spindle being forced to rotate under normal tapping conditions, with the shaft 18, by reason of the clutch engagement at 30—31. The drive occurs through shaft 18, pin 27, clutch elements 25 and 26, and is carried to the spindle by way of key 35. The lead of the tap is the same as that of the lead screw 15.

By referring to Figs. 2 and 3, it is evident that rotation of clutch member 25 in clockwise direction, while its teeth are spring-pressed against the teeth of clutch member 26, will result in driving the member 26 so long as the spring force is sufficient to preclude over-riding of the teeth under load imposed upon the driven clutch member by the tap. It will be noted that each clutch tooth has a vertical face and an inclined face, meeting at a point. In the normal direction of travel of the driving clutch member, the inclined face leads the vertical face of any one tooth, so that over-riding of the clutch teeth can occur only in the normal direction of rotation of the clutch members, which in the present instance is clockwise. Reversal of rotation of the clutch members obviously results in a positive drive.

From the foregoing, it will be understood that the inclination of the clutch teeth, or the force of spring 33, can be determinative of the torque at which the clutch teeth will over-ride under load. Normally, there will be no overriding unless the tap bottoms in the hole, or meets a hard spot or obstruction therein. In such event, tap breakage or other injury is avoided by overrunning of the clutch; and then upon reversal of the drive, the clutch teeth engage in positive drive condition to withdraw the tap from the hole.

In certain instances, as when the tap binds in the hole before bottoming, the feed induced by the lead screw 15 will continue while the tap and the spindle remain stationary. Under such circumstances, the spindle shaft 18 will continue to feed downwardly, with a resulting lowering of pin 27 within the slots 28 of the driving clutch member 25, while the clutch continues to over-run. Other taps of the machine head will in the meantime complete their tapping operation, whereupon the drive for all spindles will be reversed to withdraw all taps from the work-piece. The particular tap which had been obstructed, as above mentioned, will withdraw ahead of all the other taps, because of the fact that it failed to travel the same distance into the hole; but automatic resetting nevertheless occurs, because as soon as the obstructed tap loses its grip on those threads of the work-piece which had been formed thereby, the spring 20 will act to keep the spindle extended until the drive pin 27 reaches the normal position at the upper limits of slots 28, whereupon the spindle elevation will correspond to the elevation of all other spindles of the head.

In a similar manner, automatic resetting is provided for in the case of a tap driven against a work-piece where no hole, or an undersize hole, is present. In such a case, the tap upon contacting the work-piece may continue rotating with the spindle, but no advancement of the tap and spindle will be possible, although the lead screw will continue to advance the spindle shaft 18. As in the previous explanation, the drive pin 27 will thereupon travel the slots 28—28 of the clutch member 25 until all other taps of the machine have completed their tapping operations. Then, as the drive is reversed to withdraw all the taps, the pin will rise in the slots to the upper limit, after which the spindle will be lifted to starting position, along with all other spindles of the head. It should here be pointed out that the pin 27 will never descend so far as to reach the lower ends of slots 28—28, the slots being made sufficiently long to avoid such disposition of the pin.

Whenever the clutch 25—26 is required to over-run, as in the examples heretofore given, the heavy spring 33 yields sufficiently to permit rapid short reciprocatory movements of the driven clutch member 26, determined by the depth of the clutch teeth. The noise and vibration resulting therefrom apprises the operator concerning possible defect in tapping indicated by the over-run of the clutch, if the over-run occurs at a period other than tap-bottoming time.

From the foregoing, it will be understood that the apparatus of the present invention possesses the meritorious advantage of eliminating entirely all manual resetting of the spindles, which, in prior devices, was necessary after a defective tapping operation, to restore all the spindles to a common starting position in readiness for a subsequent tapping operation. Another very important advantage of the present structure, is the elimination of telescopic parts below the spindle 12, which have always required a run-out clearance injecting the element of lateral disalignment or wobble at the lower end of the spindle, and especially at the tap. This objection has been completely eliminated, along with the problem of precluding loss of lubricant along the spindle parts. By referring to Fig. 1, it is readily evident that any lubricant for the working parts of the spindle is effectively retained within the spindle bore 24. A lubricant supply port may be provided at 49 or elsewhere upon the spindle, and if the spindle bearing in support 12 is to be lubricated from the spindle bore, a lateral opening in the upper portion of the spindle 13 will suffice for the purpose.

To change spindles, it is necessary only to detach the outboard spindle bearing member 12 from the head, and remove the screw 14, whereupon the spindle assembly along with the nut 8 will drop from the drive shaft 6 at the splines. A substitute spindle may then be applied by reversing the procedure. In the case of a single spindle machine, substitution of a spindle may be effected by merely rotating the spindle to retract the lead screw from the nut in a downward direction, whereupon the splined end of the spindle shaft will slide downwardly from the drive shaft, permitting the assembly to pass downwardly through the bore 10.

It is to be understood that various modifications and changes in structural details of the device may be made, within the scope of the appended claims, without departing from the spirit of the invention.

What we claim is:

1. In a device of the class described, the combination of an elongate main cylinder of uniform outside diameter having open-ended axial bores, and a transverse wall separating the bores intermediate the ends of the cylinder, one of said bores being receptive of a tool holder, and the other constituting a lubricant retaining clutch housing, a clutch in the clutch housing bore comprising a cylindrical axially bored driver having a channel extending lengthwise thereof, and a cylindrical driven member in axial alignment with the driver, the driver and the driven member having abutting annular ends, clutch teeth on said annular ends, said teeth each having a sharply inclined face and a face of lesser inclination, whereby a positive drive results from rotating the driver in one direction, and an over-run results from rotation thereof in the opposite direction, with the teeth engaged, yielding means housed within the clutch housing bore forcing the teeth constantly into engagement, a sliding key connection between the driven clutch member and the main cylinder precluding rotation of the driven clutch member within the clutch housing bore, a rotatable spindle shaft having one end entering the open end of the clutch housing bore and the axial bore of the driver, means projecting laterally from said spindle shaft end, to slidably engage the elongate channel of the driver and impart rotation of the spindle shaft to said driver, yielding means constantly urging the spindle shaft outwardly from the main cylinder, means limiting said outward travel of the spindle shaft, and a lead screw thread on the spindle shaft exteriorly of the main cylinder.

2. A device in accordance with claim 1, characterized by the inclusion of adjusting means to alter the force of the yielding means which forces the clutch teeth constantly into engagement.

3. A device in accordance with claim 1, characterized by the inclusion of an adjusting screw threaded through the transverse wall which separates the cylinder bores, the screw having an inner end subject to the force of the yielding means which maintains the clutch teeth constantly in engagement and an outer head end accessible through the tool holder bore.

4. In a device of the class described, the combination of an elongate main cylinder having an exterior bearing area, a tool supporting end, and an end axially bored to provide a lubricant retaining clutch housing, a clutch in the clutch housing bore comprising a cylindrical axially bored driver rotatable within said clutch housing bore, and a cylindrical driven clutch member in axial alignment with the driver, the driver and the driven member having abutting annular ends, clutch teeth on said annular ends, yielding means housed within the clutch housing bore forcing the teeth constantly into engagement, said teeth each having a sharply inclined face and a face of lesser inclination, whereby a positive clutch drive results from rotating the driver in one direction, and an over-run of the teeth results from rotating the driver in the opposite direction, a sliding key connection between the driven clutch member and the main cylinder precluding relative rotation thereof, a rotatable spindle shaft having one end rotatable and reciprocable within the main cylinder bore, and cooperative means on said shaft end and the driver of the clutch, for transmitting rotary motion of the spindle shaft to said driver between limits of reciprocation of the spindle shaft relative to the driver, means limiting reciprocatory movement of the spindle shaft outwardly from the main cylinder bore, and a lead screw thread on the spindle shaft exteriorly of the main cylinder.

5. A device in accordance with claim 4, characterized by the fact that the yielding means which forces the clutch teeth into engagement, acts upon the driven clutch member and forces the entire clutch against the spindle shaft limiting means.

6. A device in accordance with claim 4, characterized by the inclusion of a resilient element within the main cylinder bore, acting upon said cylinder and the spindle shaft, to constantly induce extension of the main cylinder from the spindle shaft.

7. In a device of the class described, the combination of an elongate main cylinder having an exterior bearing area, and opposed axial bores extending inwardly from the ends thereof, a transverse wall apertured and threaded and separating the opposed bores aforesaid at a location intermediate the ends of the cylinder, one of said bores being receptive of a tool holder, and the other constituting a clutch housing, an adjusting screw threadedly received in the aperture of the transverse wall, said screw having a head accessible within the tool holder bore, and a point projectable into the clutch housing bore, a clutch of a type disengageable under excessive load application, comprising a cylindrical axially bored driver, and a cylindrical driven member in axial alignment therewith, the driver and the driven member being loose in the bore and having abutting annular ends including cooperative wedge-shaped teeth capable of forcing the driver and the driven member axially apart when subjected to excessive torque, a clutch spring of the compression type located axially within the housing bore, an adjusting spacer slidable in said bore and resting upon the point of the adjusting screw, the clutch spring having ends forcefully abutting the adjusting spacer and the driven member of the clutch, to yieldingly but releasably hold the clutch engaged, a sliding key connection between the driven clutch member and the main cylinder precluding relative rotation thereof, a rotatable and axially movable spindle shaft having one end rotatable and reciprocable within the main cylinder bore, an axially extensible rotary driving connection between said spindle shaft end and the driver, a retaining member on the main cylinder providing an abutment for the driver and limiting extensile movement of the spindle shaft relative to the main cylinder, and a second compression spring surrounded by the clutch spring, having opposite ends abutting the spindle shaft end and the adjusting spacer, and tending constantly to project the main cylinder relative to the spindle shaft.

8. A device in accordance with claim 7, characterized by the inclusion of means in the clutch to preclude disengagement upon reversal of the spindle shaft rotation.

9. A device in accordance with claim 7, characterized by the inclusion of means for advancing and retracting the spindle shaft longitudinally depending upon the direction of rotation thereof.

10. A device in accordance with claim 7, characterized by the fact that the elongate main cylinder is of uniform external diameter from end to end.

11. In a device of the class described, the combination of an elongate main cylinder of uniform outside diameter having open-ended axial bores, and a transverse wall separating the bores intermediate the ends of the cylinder, one of said bores being receptive of a tool holder, and the other constituting a lubricant retaining clutch housing, a clutch in the clutch housing bore comprising a driver having a channel extending lengthwise thereof, a driven member, and engageable clutch means on the driver and the driven member whereby a positive drive results from rotating the driver in one direction, and an over-run results from rotation of the driver in the reverse direction, yielding means housed within the clutch housing bore tending constantly to engage the clutch means of the driver and the driven member, a sliding key connection between the driven clutch member and the main cylinder precluding rotation of the driven clutch member within the clutch housing bore, a rotatable spindle shaft having one end entering the open end of the clutch housing bore and means projecting laterally from said spindle shaft end, to slidably engage the elongate channel of the driver and impart rotation of the spindle shaft to said driver, yielding means constantly urging the spindle shaft outwardly from the main cylinder, means limiting said outward travel of the spindle shaft, and a lead screw thread on the spindle shaft exteriorly of the main cylinder.

References Cited in the file of this patent

UNITED STATES PATENTS

| | | |
|---|---|---|
| 915,568 | Douglas | Mar. 16, 1909 |
| 1,430,556 | Jansen | Oct. 3, 1922 |
| 1,681,326 | De Leeuw | Aug. 21, 1928 |
| 2,369,751 | Olchvary | Feb. 20, 1945 |
| 2,399,966 | Welch | May 7, 1946 |

FOREIGN PATENTS

| | | |
|---|---|---|
| 87,506 | Sweden | Sept. 29, 1936 |